(12) United States Patent
Furukawa (10) Patent No.: US 8,259,319 B2
(45) Date of Patent: Sep. 4, 2012

(54) COMMUNICATION DEVICE

(75) Inventor: Akihiro Furukawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 402 days.

(21) Appl. No.: 12/693,470

(22) Filed: Jan. 26, 2010

(65) Prior Publication Data

US 2010/0188685 A1      Jul. 29, 2010

(30) Foreign Application Priority Data

Jan. 27, 2009   (JP) .................................. 2009-015822

(51) Int. Cl.
G06F 15/00     (2006.01)
G06K 1/00      (2006.01)
G06K 15/00     (2006.01)
G06F 3/12      (2006.01)

(52) U.S. Cl. ..................................... 358/1.14; 358/1.13

(58) Field of Classification Search .................. None
See application file for complete search history.

(56) References Cited

U.S. PATENT DOCUMENTS

| | | | | |
|---|---|---|---|---|
| 5,757,773 A | * | 5/1998 | Tsuji | 370/241 |
| 7,809,966 B2 | | 10/2010 | Imao | |
| 2007/0162777 A1 | | 7/2007 | Imao | |

FOREIGN PATENT DOCUMENTS

| | | |
|---|---|---|
| JP | 10-164292 A | 6/1998 |
| JP | 2000-261515 | 9/2000 |
| JP | 2007-052544 A | 3/2007 |
| JP | 2007-088707 | 4/2007 |
| JP | 2007-183797 A | 7/2007 |
| JP | 2008-123128 A | 5/2008 |
| JP | 2009-049699 A | 3/2009 |

OTHER PUBLICATIONS

JP Office Action dtd Nov. 30, 2010, JP Appln. 2009-015822, English translation.
JP Office Action dtd Mar. 8, 2011, JP Appln. 2009-015822, English translation.

* cited by examiner

*Primary Examiner* — Douglas Tran
(74) *Attorney, Agent, or Firm* — Banner & Witcoff, Ltd.

(57) ABSTRACT

A communication device may be provided with a main control unit, a condition storage unit, and a sub control unit. The sub control unit may judge, in a case where data is received while the main control unit is being in the sleeping state, whether the sleeping state is to be maintained by referring to a condition stored in the condition storage unit. The sub control unit may release the sleeping state in a case where a negative judgment is made. When object data is received, at least one of the main and sub control units may register a new condition in the condition storage unit. The registration of the new condition is executed in a case where the sleeping state of the main control unit would be released although the sleeping state of the main control unit should not be released under a presumption of the object data being received while the main control unit is being in the sleeping state.

11 Claims, 9 Drawing Sheets

COMMUNICATION DEVICE

CROSS-REFERENCE TO RELATED APPLICATION

This application claims priority to Japanese Patent Application No. 2009-015822, filed on Jan. 27, 2009, the contents of which are hereby incorporated by reference into the present application.

TECHNICAL FIELD

The present specification relates to a communication device configured to be connected with an external device in a communicable manner.

DESCRIPTION OF RELATED ART

A communication device configured to be connected with an external device in a communicable manner is known. The communication device has a central processing device, LAN board, etc. If the central processing device remains in an inactive state of not performing any function for a predetermined time period, a main power source supplied to the central processing device is turned off. The central processing device thereby assumes a sleeping state, allowing power-saving to be achieved. While the main power source is off, the LAN board analyzes packets sent from other devices. If the LAN board receives a packet including a MAC address of the communication device, the LAN board turns the main power source on. In another case, if the LAN board receives a broadcast packet, the LAN board turns the main power source on, on a condition that the communication device can execute a function that an execution thereof is designated in this broadcast packet.

SUMMARY

In the above technique, the condition for releasing the sleeping state of the central processing device (i.e., the off state of the main power source) is fixed. For example, if a packet including the MAC address of the communication device (termed "specific packet" below) is received, the sleeping state of the central processing device may be released. However, upon analyzing the specific packet, it may turn out that the central processing device does not need to execute any processing in accordance with the specific packet. If the specific packet is received again, the sleeping state of the central processing device will again be released, even though this releasing is unnecessary. Such circumstance happens because the condition for releasing the sleeping state of the central processing device is fixed.

The present specification teaches a technique capable of preventing a sleeping state of a main control unit (the central processing device in the above example) from being released at unnecessary occasions.

One aspect of techniques disclosed in the present embodiment is a communication device configured to be connected with the external device in a communicable manner. The communication device may comprise a receiving unit configured to receive data sent from the external device, a main control unit configured to shift its state between a sleeping state and a non-sleeping state, a condition storage unit configured to store at least one of a condition for maintaining the sleeping state of the main control unit and a condition for releasing the sleeping state of the main control unit, and a sub control unit. The sub control unit may comprise a first judging unit and a releasing unit. The first judging unit may be configured to judge, in a case where the data is received by the receiving unit while the main control unit is being in the sleeping state, whether the sleeping state of the main control unit is to be maintained based on specific information included in the data by referring to the condition stored in the condition storage unit. The releasing unit may be configured to release the sleeping state of the main control unit in a case where a negative judgment is made by the first judging unit. At least one of the main control unit and the sub control unit may further comprise a registration unit configured to register, when object data is received by the receiving unit, a new condition in the condition storage unit based on the specific information included in the object data. The registration unit may be configured to execute the registration of the new condition in a case where the sleeping state of the main control unit would be released by the releasing unit although the sleeping state of the main control unit should not be released under a presumption of the object data being received while the main control unit is being in the sleeping state.

The above term "In a case where the sleeping state of the main control unit would be released . . . under a presumption of the object data being received while the main control unit is being in the sleeping state" may include, but not limited to, at least one of the following two cases: (1) the object data is received while the main control unit is being in the sleeping state, the sleeping state of the main control unit is released, and the main control unit whose sleeping state has been released does not need to execute a process based on the object data; (2) the object data is received while the main control unit is being in the non-sleeping state, and the main control unit does not need to execute a process based on the object data. Furthermore, data not requiring the main control unit to execute a process may be termed, but not limited to, "invalid data". The registration unit may register a new condition based on the invalid data only in a first case in which the main control unit receives invalid data during the sleeping state, or it may register a new condition based on the invalid data only in a second case in which the main control unit receives invalid data during the non-sleeping state. Further, the registration unit may register a new condition in both the first case and the second case.

The technique taught by the present specification can be realized in various aspects, such as a communication device, a control method of a communication device, a computer program in a computer for controlling a communication device, a recording medium for recording the computer program, etc.

DETAILED DESCRIPTION OF THE PREFERRED EMBODIMENT

Embodiment (Configuration of System)

Figure 1:
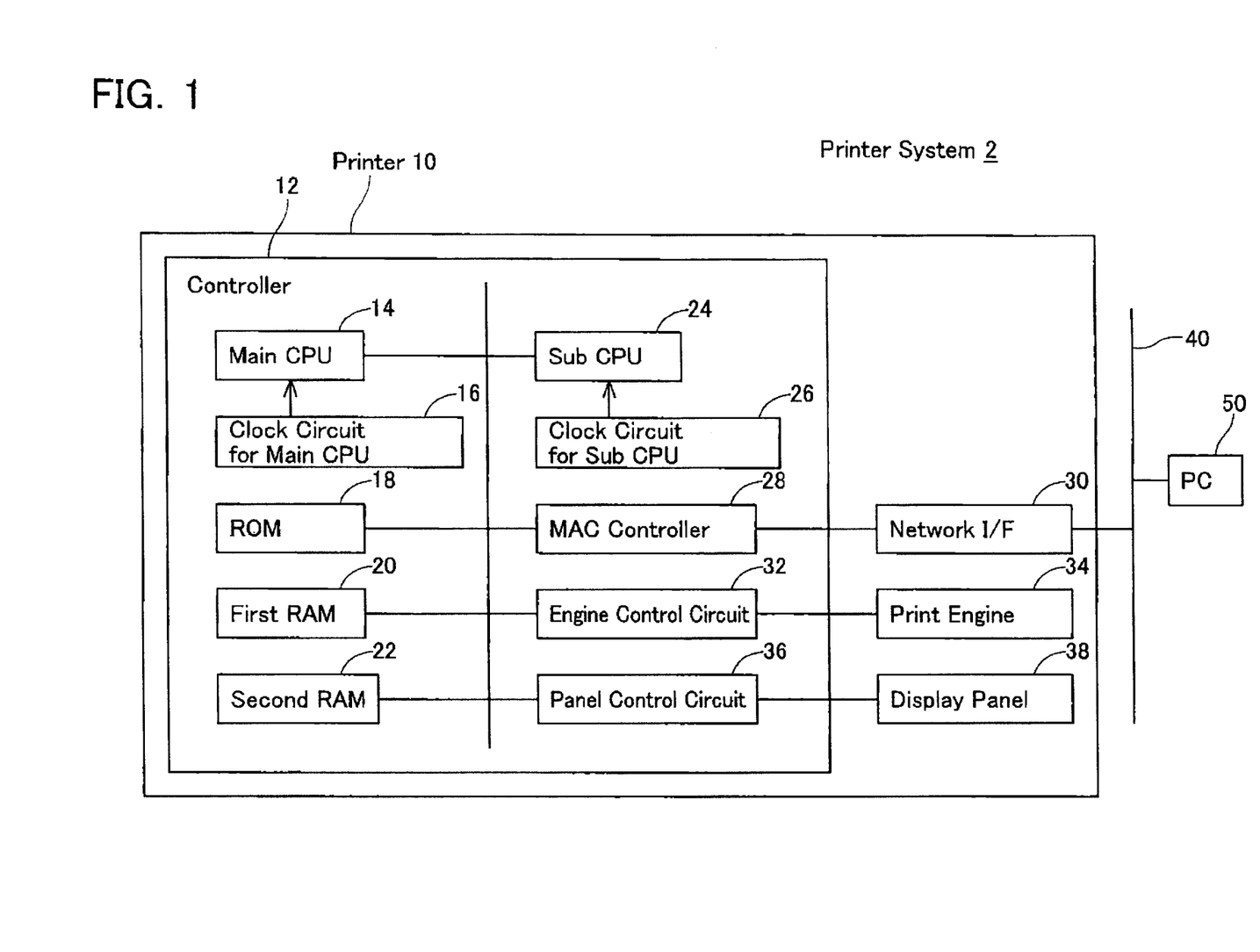
FIG. 1 shows a schematic configuration of a printer system.

The embodiment will be described with reference to the figures. As shown in FIG. 1, a printer system 2 has a printer 10, PC 50, etc. The printer 10 has a controller 12, network interface 30, print engine 34, display panel 38, etc. The controller 12 has a main CPU 14, clock circuit 16 for main CPU, ROM 18, plurality of RAM 20, 22, sub CPU 24, clock circuit 26 for sub CPU, MAC controller 28, engine control circuit 32, panel control circuit 36, etc.

The main CPU 14 executes various processes in accordance with programs stored in the ROM 18. The main CPU 14 contains a timer mechanism termed "standby state timer" hereinbelow. The clock circuit 16 for main CPU supplies a clock signal to the main CPU 14. The main CPU 14 is in a non-sleeping state (e.g., a standby state and a processing state as described below) while being supplied with the clock signal. The main CPU 14 is in a sleeping state while not being supplied with the clock signal. The clock circuit 16 for main CPU is controlled by the sub CPU 24. The manner of control is described in detail later.

The ROM 18 stores various programs executed by the main CPU 14 and the sub CPU 24. More specifically, the ROM 18 stores a plurality of applications. The RAMs 20, 22 are capable of storing data such as those shown in FIG. 2. A circuit (not shown) is also present for supplying a clock signal to each of the first RAM 20 and second RAM 22. The first RAM 20 is a storage area 110 constantly supplied with the clock signal while the power source of the printer 10 is ON. Below, the storage area 110 is termed "non-sleep storage area 110". The second RAM 22 is a storage area 112 supplied with the clock signal while the main CPU 14 is in the non-sleeping state, and not supplied with the clock signal while the main CPU 14 is in the sleeping state. Consequently, the sub CPU 24 cannot read the stored contents of the storage area 112 while the main CPU 14 is in the sleeping state. Below, the storage area 112 is termed "sleep storage area 112".

Figure 2:
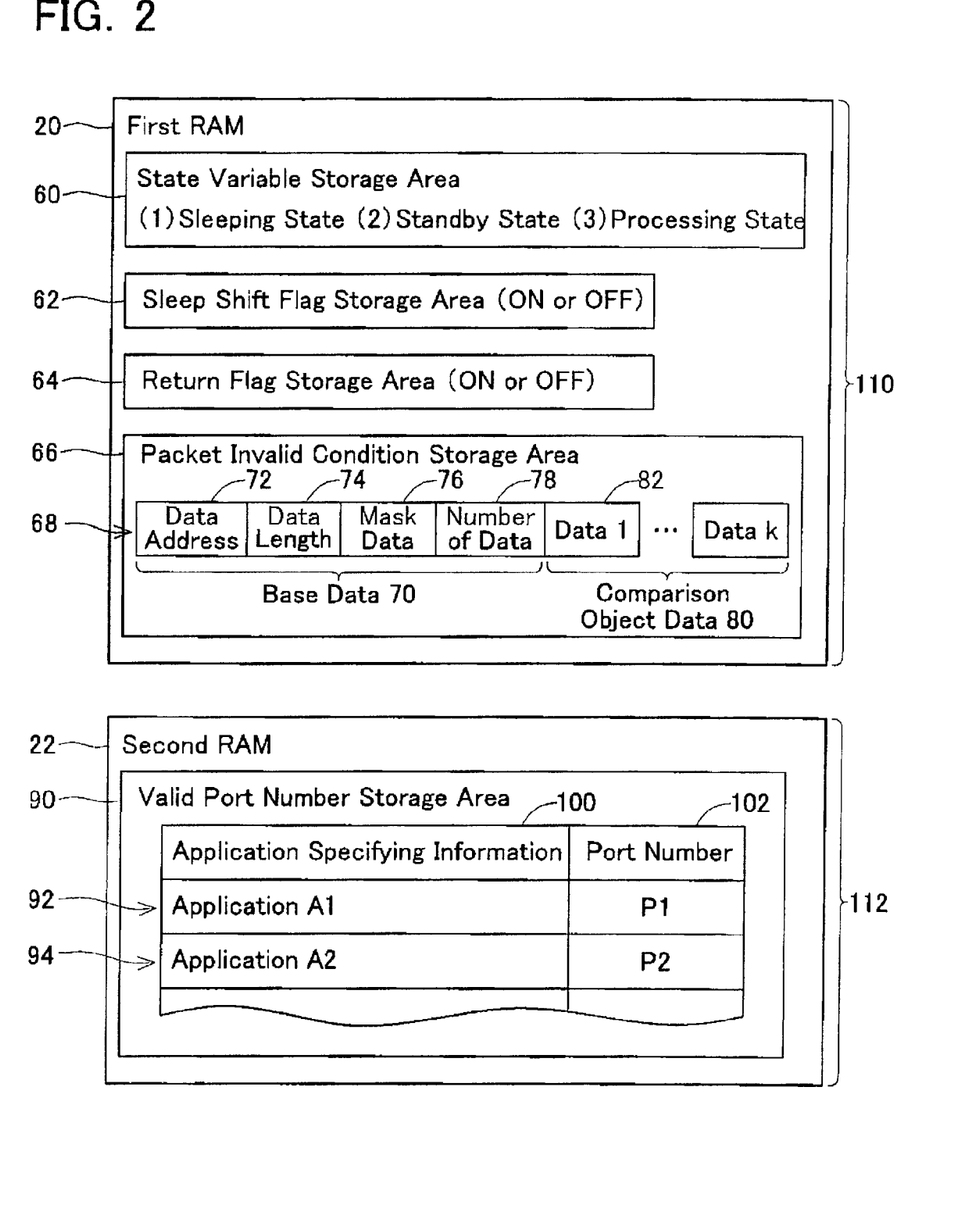
FIG. 2 shows an example of stored contents of a RAM.

The first RAM 20 has storage areas 60, 62, 64, 66 for storing a plurality of types of data. The state variable storage area 60 is a storage area for storing state variables. The present embodiment has three state variables: sleeping state, standby state, and processing state. The sleep shift flag storage area 62 is a storage area for storing a sleep shift flag (ON or OFF). The sleep shift flag is a flag for shifting the main CPU 14 into the sleeping state even if a predetermined time period has not passed since having shifted to the non-sleeping state. The return flag storage area 64 is a storage area for storing a return flag (ON or OFF). The return flag is a flag for indicating whether the main CPU 14 has just returned from the sleeping state to the non-sleeping state. The packet invalid condition storage area 66 is a storage area for storing packet invalid condition data 68.

The second RAM 22 has a valid port number storage area 90. As described above, the ROM 18 stores the plurality of applications. A port number is set for each of these applications. The valid port number storage area 90 is a storage area for storing an association of application and port number. The valid port number storage area 90 can store a plurality of data associations 92, 94. Each of the data associations 92, 94 is an association of application specifying information 100 for specifying an application and a port number 102 set for this application. The data association 92 is an association of, e.g., application A1 and port number P1, and the data association 94 is an association of, e.g., application A2 and port number P2. When the power source of the printer 10 is turned ON, the main CPU 14 executes a process to write the data associations 92, 94 into the valid port number storage area 90. The data associations 92, 94 corresponding to each of the applications stored in the ROM 18 are thereby written into the valid port number storage area 90.

The sub CPU 24 shown in FIG. 1 executes processes in accordance with programs stored in the ROM 18. The clock circuit 26 for sub CPU supplies the clock signal to the sub CPU 24. The clock circuit 26 for sub CPU has a lower clock signal frequency than the clock circuit 16 for main CPU. Consequently, power consumption for driving the sub CPU 24 is lower than that for driving the main CPU 14. In the present embodiment, the clock signal is supplied constantly from the clock circuit 26 for sub CPU to the sub CPU 24 while the power source of the printer 10 is ON. In the present embodiment, the sub CPU 24 does not sleep. In another embodiment, the sub CPU 24 may be configured to sleep.

The MAC controller 28 changes data (can also be termed "packet") received by the network interface 30 into a format that the printer 10 can process. The network interface 30 is connected to a LAN 40. The LAN 40 is connected to the PC 50. The network interface 30 receives data sent from the PC 50. The printer 10 is connected communicably to the PC 50 via the network interface 30. The engine control circuit 32 controls the print engine 34 in accordance with commands from the main CPU 14. The panel control circuit 36 controls the display panel 38 in accordance with commands from the main CPU 14.

(State of Main CPU)

Figure 3:
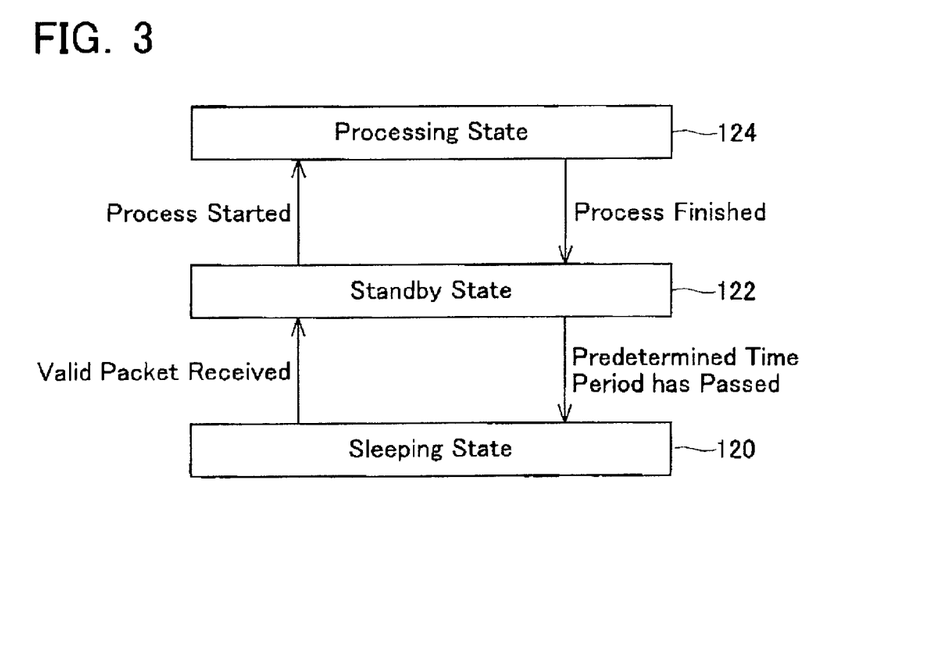
FIG. 3 shows how states of a main CPU shift.

The state of the main CPU 14 will be explained. As shown in FIG. 3, the main CPU 14 shifts its state between the sleeping state 120, standby state 122, and processing state 124. The main CPU 14 is in the sleeping state 120 while the clock signal is not being supplied from the clock circuit 16 for main CPU. If a valid packet (a packet assumed to require operation by the main CPU 14) is received via the network interface 30 while the main CPU 14 is in the sleeping state 120, the clock signal is supplied to the main CPU 14. Consequently, the main CPU 14 shifts to the standby state 122. In the standby state 122, the main CPU 14 analyzes the packet contents, and judges in accordance with this analysis whether execution of a process using an application is necessary. If a positive judgement is obtained, the main CPU 14 activates the application corresponding to the packet. The main CPU 14 thereby shifts to the processing state 124 for executing the process in accordance with the activated application.

When the process has ended, the main CPU 14 shifts to the standby state 122. In the standby state 122, the clock signal is supplied to the main CPU 14. When the main CPU 14 shifts to the standby state 122, the standby state timer starts. If a state of not receiving a valid packet continues for a predetermined time period, supply of the clock signal to the main CPU 14 is suspended. Consequently, the main CPU 14 shifts to the sleeping state 120. If a valid packet is received during the standby state 122 and the application corresponding to this packet is activated, the main CPU 14 shifts to the processing state 124.

(Contents of Packet)

Figure 4:
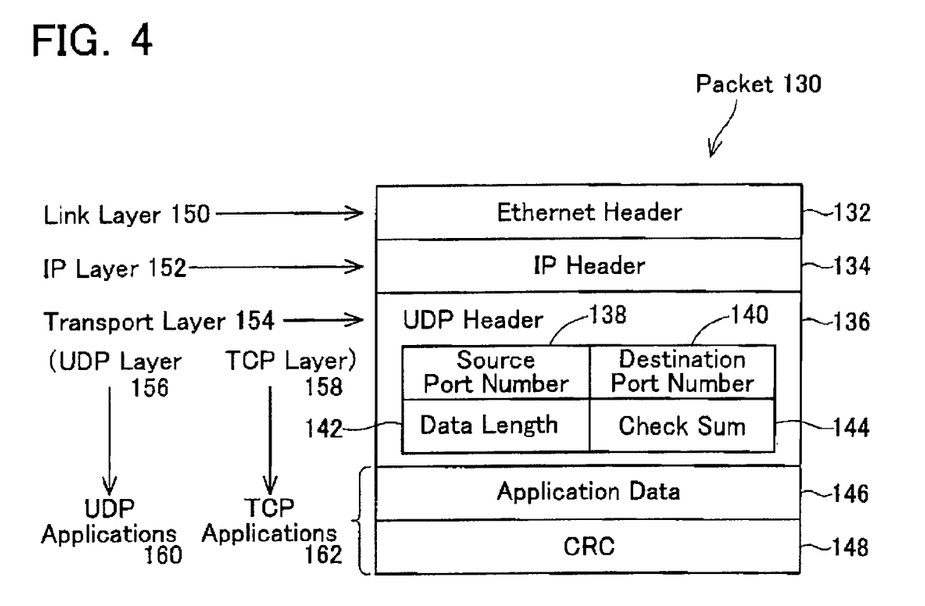
FIG. 4 shows an example of a packet.

Next, the contents of the packet received by the network interface 30 will be explained. As shown in FIG. 4, a packet 130 includes an Ethernet header 132, IP header 134, UDP header 136, application data 146, and CRC 148. The Ethernet header 132 is a header processed in a link layer 150, and includes a source MAC address, destination MAC address, identification code indicative of its upper layer. Specifically, this identification code indicates a network layer or IP layer 152 (e.g. Pv4, IPv6, etc.) that is an upper layer of the link layer 150. The source MAC address is an MAC address of the source of the packet 130 (e.g., the PC 50). The destination MAC address is an MAC address of the printer 10. The IP header 134 is a header processed in an IP layer 152, and includes a source IP address, destination IP address, identification code indicative of its upper layer. Specifically, this identification code indicates a transport layer 154 (e.g. TCP, UDP, etc.) that is an upper layer of the IP layer 152.

The UDP header 136 is a header processed in a transport layer 154, and includes a source port number 138, destination port number 140, data length 142, check sum 144, etc. The source port number 138 is a port number set for an application that executes the sending process of the packet 130 in the source of the packet 130 (e.g., the PC 50). The destination port number 140 is identification information for designating the application to process the packet 130 in the printer 10 that is the destination of the packet 130. The data length 142 is the total data size of the UDP header 136 and the application data 146. The check sum 144 is data for checking the compatibility of the packet 130. The transport layer 154 can be divided into a UDP layer 156 and a TCP layer 158. The UDP header 136 is processed by the UDP layer 156. A packet (not shown) exists having a TCP header instead of the UDP header 136. In the case of this packet, the TCP header is processed by the TCP layer 158. As in the case of the UDP header, the TCP header includes a source port number, destination port number, check sum, etc.

The application data 146 is data processed by applications 160, 162. In the case of the UDP packet 130 (i.e. in the case that the packet has the UDP header 136), the application data 146 is processed by the UDP application 160. In the case of a TCP packet (i.e. in the case that the packet has a TCP header), the application data is processed by the TCP application 162. The CRC (Cyclic Redundancy Check) 148 is data for checking the validity of the packet 130 in the link layer (MAC sublayer) 150.

(Sleeping State Control Process of Main CPU)

Figure 5:
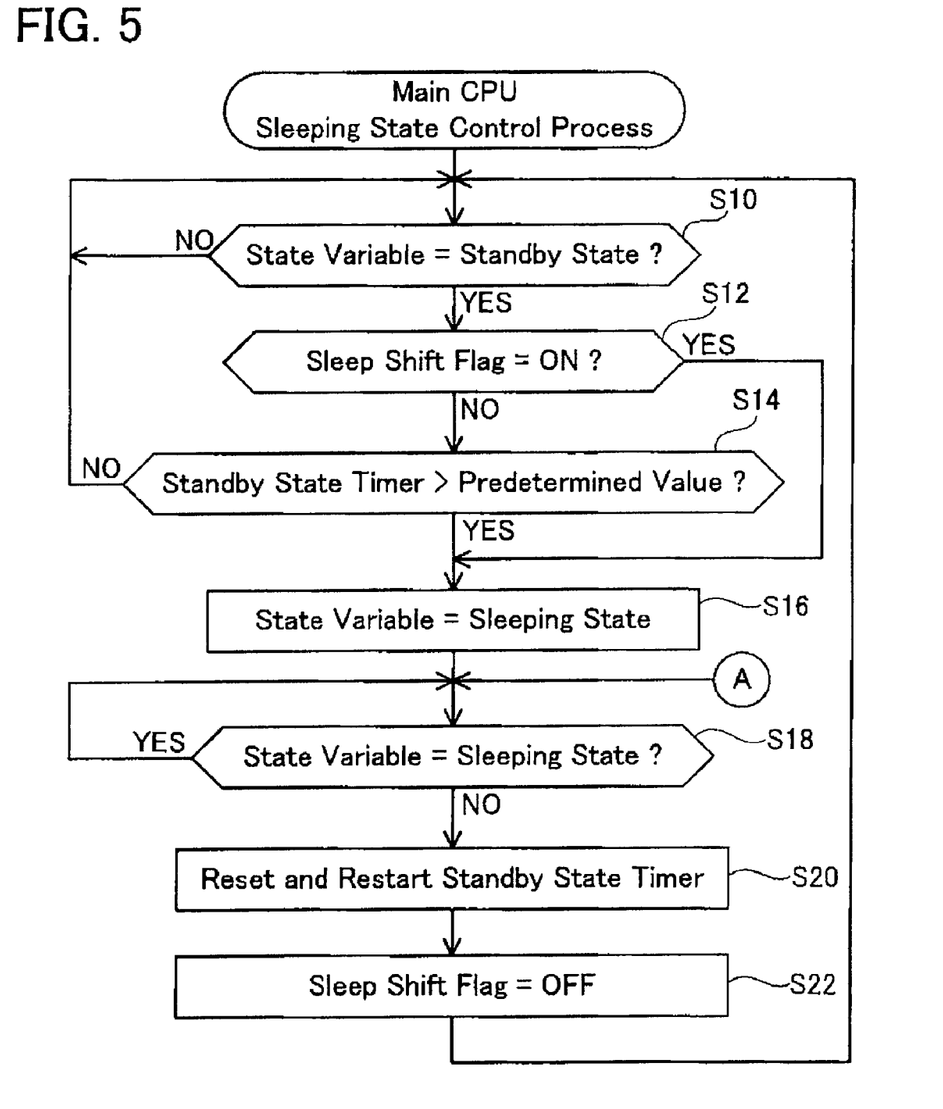
FIG. 5 shows a flowchart of a main CPU sleeping state control process.

Next, the contents of a process executed by the main CPU 14 will be explained. The process of FIG. 5 is initiated with the power source of the printer 10 being turned ON as a trigger. At the time when the power source of the printer 10 is turned ON, the main CPU 14 is in the standby state 122, and a state variable indicating the standby state 122 is stored in the state variable storage area 60. Moreover, the standby state timer of the main CPU 14 starts after the standby state timer has been reset with the power source of the printer 10 being turned ON as a trigger.

The main CPU 14 judges whether the state variable stored in the state variable storage area 60 indicates the standby state 122 (S10). If the answer is YES, the main CPU 14 proceeds to S12. If the answer is NO, the main CPU 14 repeats the judgement of S10. In S12, the main CPU 14 judges whether the flag stored in the sleep shift flag storage area 62 is ON. If the answer is NO, the main CPU 14 judges whether the standby state timer exceeds a predetermined value that is determined in advance (S14). The main CPU 14 proceeds to S16 if the answer is YES, and returns to S10 if the answer is NO. If the answer is YES in S12, the main CPU 14 skips S14 and proceeds to S16.

In S16, the main CPU 14 changes the state variable stored in the state variable storage area 60 (the state variable indicative of the standby state) into a state variable indicating the sleeping state. Next, the main CPU 14 waits until the state variable stored in the state variable storage area 60 changes into a state indicating a state other than the sleeping state (S18). If the state variable stored in the state variable storage area 60 indicates the sleeping state, as will be described, the sub CPU 24 suspends supply of the clock signal from the clock circuit 16 for main CPU (see S92 of FIG. 9). The main CPU 14 thereby shifts into the sleeping state 120.

As will be described in detail later, release of the sleeping state 120 of the main CPU 14 is executed by the sub CPU 24 (see S124 of FIG. 10). When the sub CPU 24 releases the sleeping state 120 of the main CPU 14, the state variable stored in the state variable storage area 60 (the state variable indicative of the sleeping state) changes to a state variable indicating the standby state. The circle A of FIG. 5 shows the point where the main CPU 14 restarts processes if the main CPU 14 returns from the sleeping state 120 to the standby state 122. If the main CPU 14 has returned from the sleeping state 120 to the standby state 122, the main CPU 14 executes process S18. If the main CPU 14 has returned from the sleeping state 120 to the standby state 122, the main CPU 14 judges NO in S18, because the sub CPU 24 has written the state variable indicating the standby state into the state variable storage area 60 (see S122 of FIG. 10). In this case, the main CPU 14 proceeds to S20.

In S20, the main CPU 14 resets and restarts the standby state timer. Next, the main CPU 14 changes the flag stored in the sleep shift flag storage area 62 to OFF (S22). When S22 ends, the main CPU 14 returns to S10. Although not shown in the flowchart, the main CPU 14 also resets and restarts the standby state timer upon shifting from the processing state 124 to the standby state 122.

(Packet Process of Main CPU)

Figure 6:
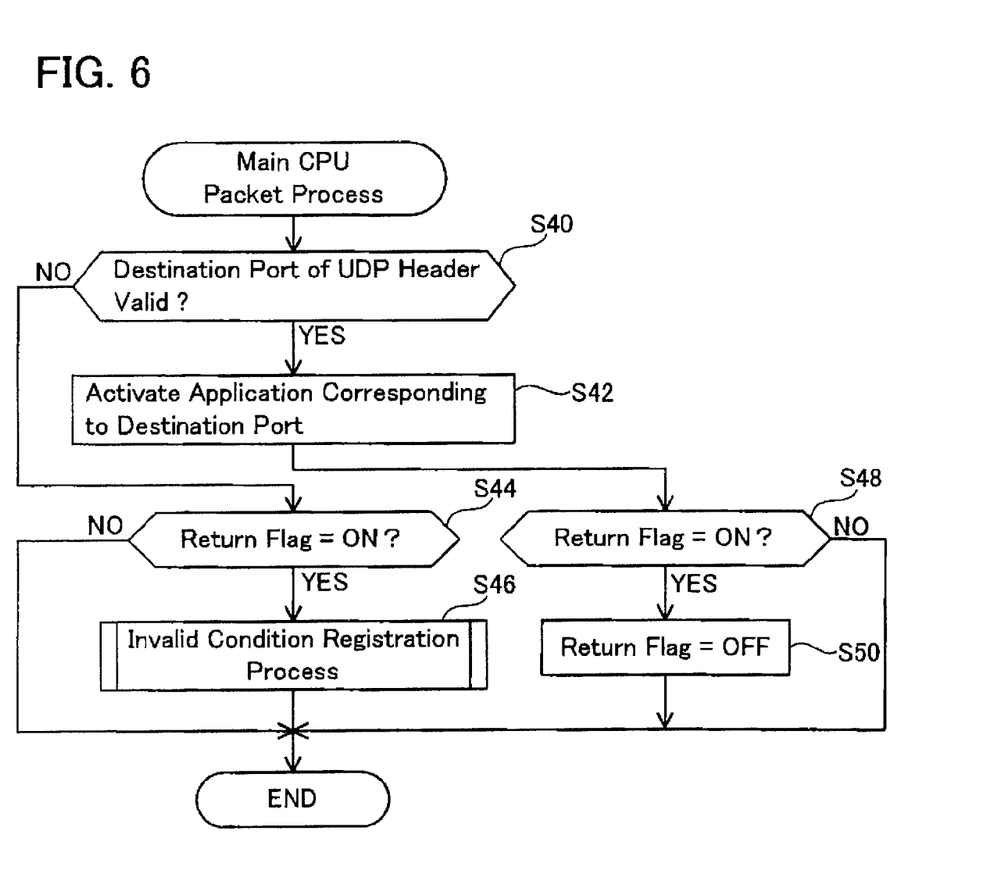
FIG. 6 shows a flowchart of a main CPU packet process.

Next, the contents of a packet process executed by the main CPU 14 will be explained. The process of FIG. 6 is executed with either of the followings as the trigger: a packet is received via the network interface 30 while the main CPU 14 is in one of the non-sleeping states; or a packet is received via the network interface 30 while the main CPU 14 is in the sleeping state, and the sub CPU 24 releases the sleeping state 120 of the main CPU 14 in response to receipt of the packet. In the present embodiment, the contents of the process of FIG. 6 will be explained using, as an example, the case of the UDP packet 130 having been received.

The main CPU 14 judges whether the destination port number 140 included in the UDP header 136 of the packet 130 is valid (S40). Specifically, the main CPU 14 judges whether the destination port number 140 included in the UDP header 136 is present in either of the data associations 92, 94 stored in the valid port number storage area 90. If the answer is YES, the main CPU 14 specifies, from the valid port number storage area 90, the application specifying information 100 (e.g., A1) associated with the destination port number 140 included in the UDP header 136. Next, the main CPU 14 activates the application specified by the specified application specifying information 100 (S42). In accordance with this application, the main CPU 14 executes a process corresponding to the application data 146 of the packet 130. The main CPU 14 executes e.g. a process commanding the engine control circuit 32 to print.

After completing S42, the main CPU 14 judges whether the flag stored in the return flag storage area 64 is ON (S48). If the answer is YES, the main CPU 14 changes the flag stored in the return flag storage area 64 to OFF (S50). If the answer is NO in S48, S50 is skipped.

If the destination port number 140 included in the UDP header 136 is not present in any of the data associations 92, 94 stored in the valid port number storage area 90, NO is judged in S40. In this case, the main CPU 14 judges whether the flag stored in the return flag storage area 64 is ON (S44). If the answer is YES, the main CPU 14 executes an invalid condition registration process (S46). If the answer is NO in S44, S46 is skipped.

(Invalid Condition Registration Process of Main CPU)

Figure 7:
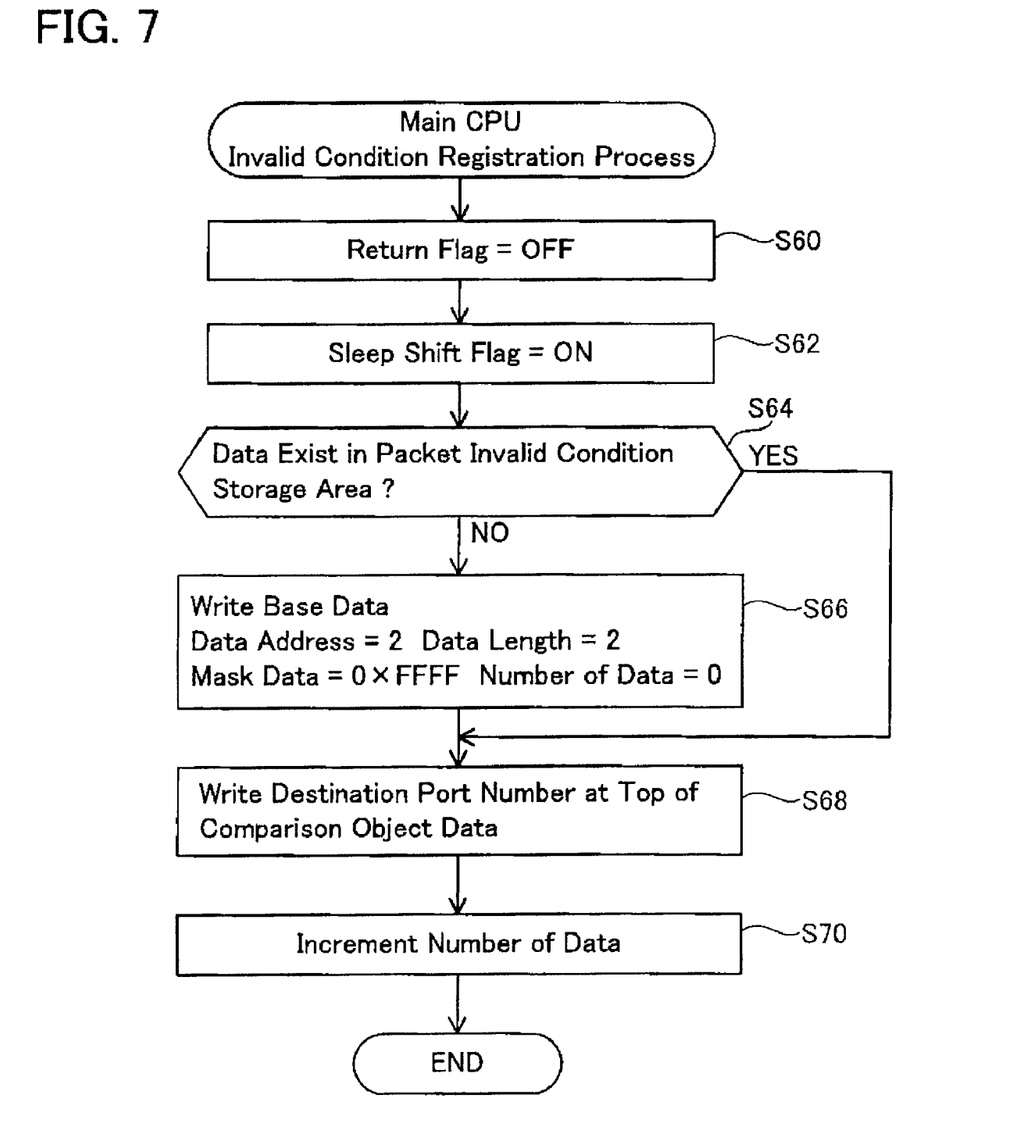
FIG. 7 shows a flowchart of a main CPU invalid condition registration process.

Next, the contents of the invalid condition registration process executed in S46 of FIG. 6 will be explained. As shown in FIG. 7, the main CPU 14 changes the flag stored in the return flag storage area 64 to OFF (S60). Next, the main CPU 14 changes the flag stored in the sleep shift flag storage area 62 to ON (S62). Then, the main CPU 14 judges whether at least one item of the packet invalid condition data 68 is being stored in the packet invalid condition storage area 66 (S64). If the answer is NO, the main CPU 14 proceeds to S66. If the answer is YES, S66 is skipped and the main CPU 14 proceeds to S68.

Figure 8:
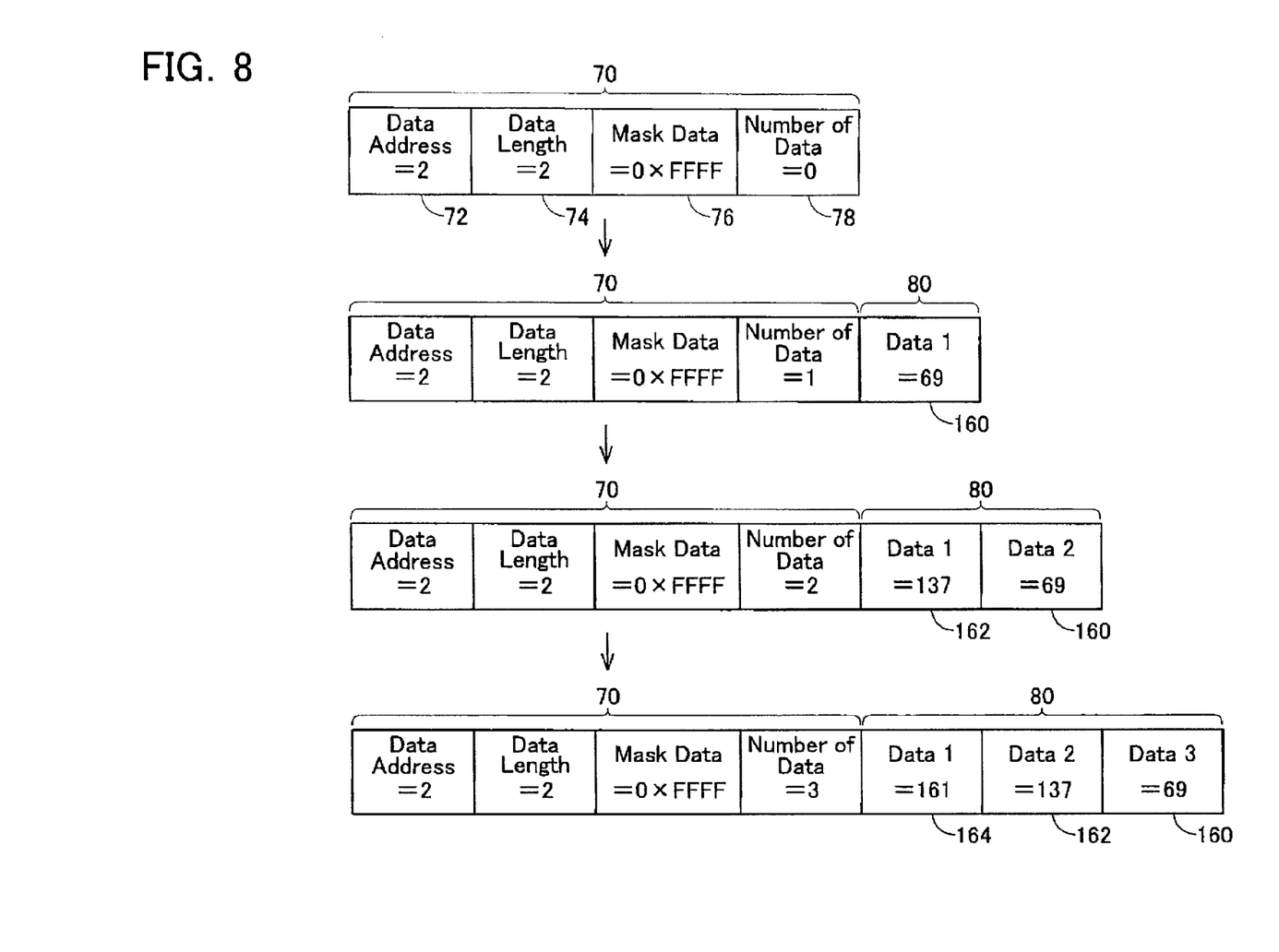
FIG. 8 shows how packet invalid condition data is registered.

In S66, the main CPU 14 writes the packet invalid condition data 68 into the packet invalid condition storage area 66. Before explaining the contents of this process, the configuration of the packet invalid condition data 68 will be explained with reference to FIG. 2. The packet invalid condition data 68 includes base data 70 and comparison object data 80. The base data 70 includes data address 72, data length 74, mask data 76, and number of data 78. In the process S66 of FIG. 7, the main CPU 14 writes the base data 70. Specifically, the main CPU 14 writes, as the data address 72, address information ("2" in the example of S66) for specifying the address of the destination port number 140 from the bit string of the UDP header 136 of the packet 130. The main CPU 14 writes, as the data length 74, the data size of the destination port number 140 included in the UDP header 136 ("2 bytes" in the example of FIG. 7). In the case of the UDP packet 130, the main CPU 14 writes "0 x FFFF" as the mask data 76. "0 x FFFF" means that the data of 16 bits is not masked. This means that all the data of 16 bits (2 bytes) designated by the data address 72 and the data length 74 can represent the destination port number 140. Further, the main CPU 14 writes "0" as the number of data 78. The number of data 78 indicates the number of data written as the comparison object data 80. Nothing is written into the comparison object data 80 at the time of the process S66. The uppermost figure in FIG. 8 shows an example of the base data 70 written by the process S66.

Next, the main CPU 14 writes the comparison object data 80 of the packet invalid condition data 68 (S68). Further, the main CPU 14 adds 1 to the number of data 78 of the base data 70 (S70). As shown in FIG. 2, a plurality of items of data 82 can be written as the comparison object data 80. The main CPU 14 writes, at the top of the comparison object data 80, the destination port number 140 included in the UDP header 136 of the packet 130. If no item of data 82 is written as the comparison object data 80, the destination port number 140 written in S68 inevitably becomes the top. For example, the figure second from top in FIG. 8 shows only one item of data 160 (port number "69") having been written. In this figure, the number of data is "1". If at least one item of data is written as the comparison object data 80, the main CPU 14 moves this data to the rear (to the right in FIG. 2) and writes new data in the area in which this data had been written before the moving. The new data is thereby written at the top. Further, if data 162 (port number "137") is newly written from the state of the figure second from top in FIG. 8, the data 160 moves to the rear, and the data 162 is written at the top, as shown in the figure third from top in FIG. 8. In this figure, the number of data is "2". Further, if data 164 (port number "161") is newly written from the state of the figure third from top in FIG. 8, the data 160 and data 162 are both moved to rearward, and the data 164 is written at the top, as shown in the lowermost figure of FIG. 8. In the plurality of data 160, 162, 164 included in the comparison object data 80, the data present at the left (top) is the more recently written data.

(Sleeping State Control Process of Sub CPU)

Next, the contents of a process executed by the sub CPU 24 will be explained. The process of FIG. 9 starts with the power source of the printer 10 being turned ON as the trigger. The sub CPU 24 judges whether the state variable stored in the state variable storage area 60 indicates the sleeping state 120 (S90). The sub CPU 24 proceeds to S92 if the answer is YES, and repeats the judgement of S90 if the answer is NO. In S92, the sub CPU 24 suspends supply of the power source to the clock circuit 16 for main CPU. Supply of the clock signal from the clock circuit 16 for main CPU to the main CPU 14 is thereby suspended. The main CPU 14 shifts to the sleeping state 120. Further, in S92, the sub CPU 24 suspends supply of the clock signal to the sleep storage area 112 (i.e. the second RAM 22). It thereby becomes impossible to read the data stored in the sleep storage area 112 (e.g., the data stored in the valid port number storage area 90).

Figure 9:
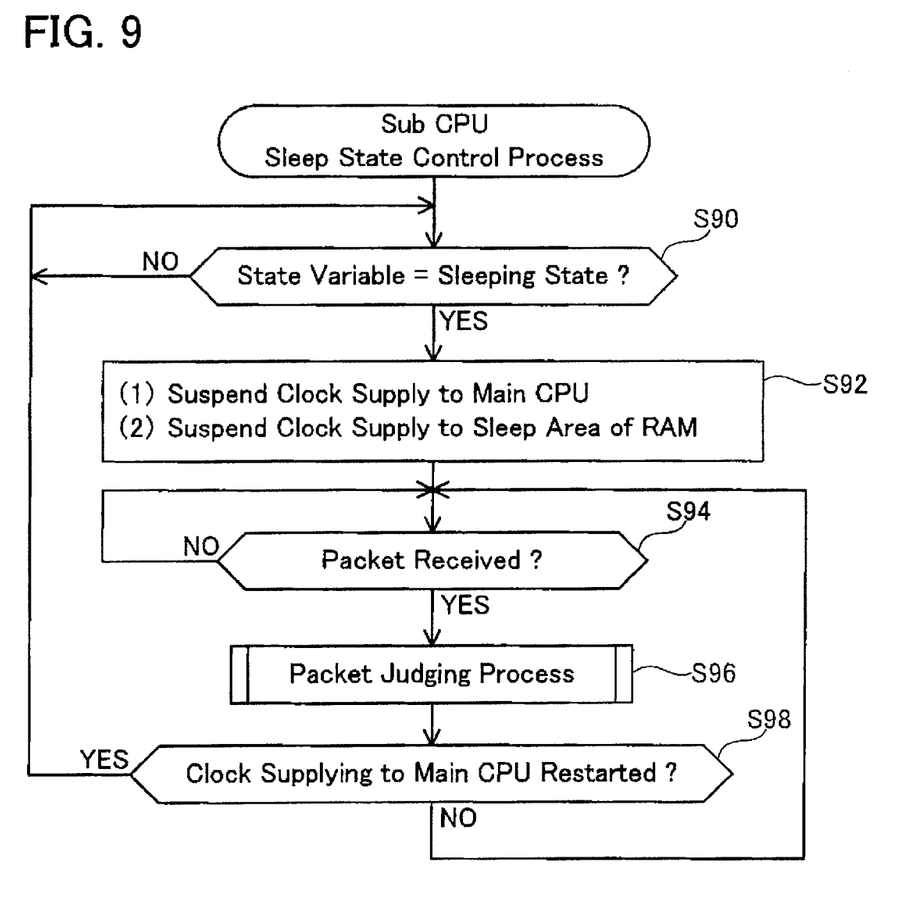
FIG. 9 shows a flowchart of a sub CPU sleeping state control process.

Next, the sub CPU 24 monitors whether the network interface 30 has received a packet (S94). If the answer is YES, the sub CPU 24 executes a packet judging process (S96). The packet judging process will be explained in detail later. When the packet judging process is executed, supply of the clock signal to the main CPU 14 may possibly be restarted. The sub CPU 24 judges whether supply of the clock signal to the main CPU 14 has been restarted (S98). The sub CPU 24 returns to S90 if the answer is YES, while on the other hand returns to S94 if the answer is NO.

(Packet Judging Process of Sub CPU)

Next, the contents of the packet judging process executed in S96 of FIG. 9 will be explained with reference to a flowchart in FIG. 10. In the present embodiment, the contents of the process of FIG. 10 will be explained using the case where the UDP packet 130 shown in FIG. 4 has been received as an example. Further, the contents of the process of FIG. 10 will be explained using the case where the data of the lowermost figure of FIG. 8 have been stored in the packet invalid condition storage area 66 as an example.

The sub CPU 24 specifies the destination port number 140 included in the UDP header 136 of the received packet 130 in accordance with the data address "2" and data length "2" of the base data 70 stored in the packet invalid condition storage area 66 (S110). Next, the sub CPU 24 specifies the top data 164 (port number "161") of the comparison object data 80 stored in the packet invalid condition storage area 66 (S112). The sub CPU 24 judges whether the destination port number 140 specified in S110 matches with the port number specified in S112 (S114). If the answer is YES, the sub CPU 24 skips S116 to S124 (to be described), and ends the packet judging process. In this case, the sleeping state of the main CPU 14 is not released.

If the answer is NO in S114, the sub CPU 24 judges whether the process S114 has been executed for the bottom data (data that has been stored in the longest period; the data 160 (port number "69") in the lowermost figure in FIG. 8) of the comparison object data 80 stored in the packet invalid condition storage area 66 (S116). If the answer is NO, the sub CPU 24 specifies the next data of the comparison object data 80 (data immediately to the right (e.g., the data 162)) (S118). Next, the sub CPU 24 judges whether the destination port number 140 read in S110 matches with the port number specified in S118 (S114). The processes S114 to S118 are repeated until YES is judged in S114 or S116.

If the answer is YES in S116, this means that the destination port number 140 specified in S110 had not matched with any of the data 160 to 164 of the comparison object data 80. In this case, the sub CPU 24 changes the flag stored in the return flag storage area 64 to ON (S120). Moreover, the sub CPU 24 changes the state variable stored in the state variable storage area 60 to a state variable indicating the standby state (S122). Next, the sub CPU 24 drives the clock circuit 16 for main CPU for restarting clock signal supply to the main CPU 14 (S124). Further, in S124, the sub CPU 24 restarts clock signal supply to the sleep storage area 112 (i.e., the second RAM 22). It thereby becomes possible to read the data stored in the sleep storage area 112 (e.g., the data stored in the storage area 90). The main CPU 14 whose sleeping state 120 has been released by the sub CPU 24 executes the packet process of FIG. 6.

The printer system 2 of the present embodiment has been explained in detail. If the main CPU 14 of the printer 10 has judged its execution of any process unnecessary based on the destination port number (e.g., the port number "69") included in the received packet 130 (if the answer is NO in S40 of FIG. 6), the main CPU 14 registers this destination port number (e.g., the port number "69") in the packet invalid condition storage area 66. That is, the main CPU 14 registers the new condition, in accordance with analysis of the packet 130, in the packet invalid condition storage area 66. The main CPU 14 can dynamically register the conditions in accordance with analysis of the packet 130. Consequently, the sub CPU 24 can maintain the sleeping state 120 of the main CPU 14 even if a packet including the destination port number (e.g., the port number "69") is received repeatedly during the sleeping state 120 of the main CPU 14. In the present embodiment, unnecessary release of the sleeping state 120 of the main CPU 14 can be inhibited. Unlike the conventional art in which the condition for releasing the sleeping state of the main control unit is fixed, it is possible to inhibit the release of the sleeping state of the main control unit upon receipt of invalid data.

In the present embodiment, the likelihood of the sleeping state 120 of the main CPU 14 being released unnecessarily can be gradually reduced since the conditions in the packet invalid condition storage area 66 are added sequentially. It is also not necessary to register the conditions in advance in the packet invalid condition storage area 66.

Figure 10:
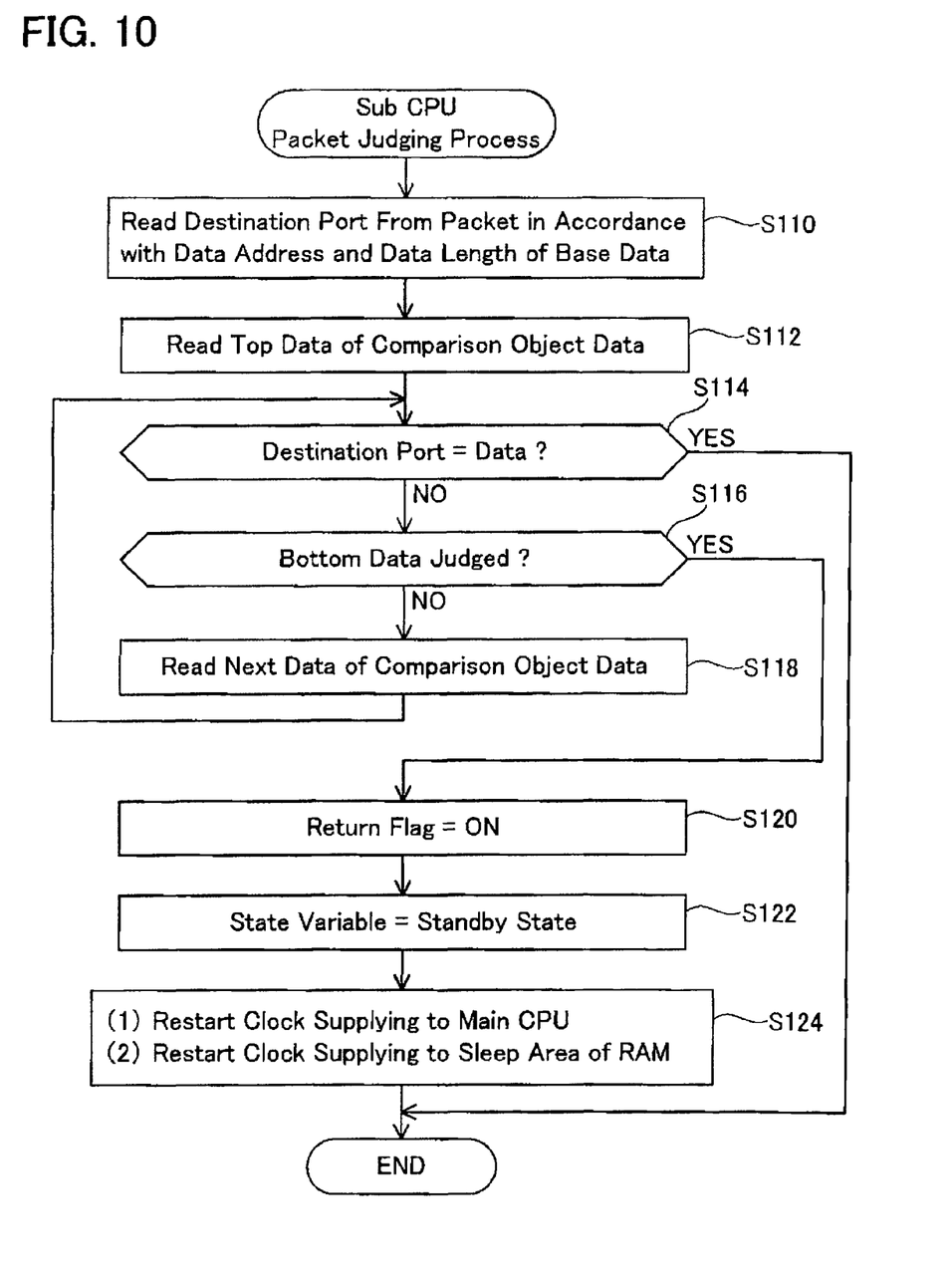
FIG. 10 shows a flowchart of a sub CPU packet judging process.

In the present embodiment, the sub CPU 24 executes the judgement of S114 of FIG. 10 in reverse chronological order of registration of the data 160, 162, 164 registered in the packet invalid condition storage area 66. When the invalid packet 130 not requiring the main CPU 14 to execute a process is received repeatedly within a short interval, the sub CPU 24 can judge YES in S114 by referring to only a comparatively small amount of data (e.g. only the data 164). The process load on the sub CPU 24 can thereby be reduced.

In the present embodiment, if, during the sleeping state 120, the main CPU 14 receives a valid packet (which requires the main CPU 14 to execute a process; and for which YES is judged in S40 of FIG. 6), the main CPU 14 shifts through the processing state 124 to the standby state 122, and again shifts to the sleeping state 120 after a predetermined time period has passed since the standby state timer was restarted at that time (see FIG. 3). Another valid packet may be received repeatedly within a short interval from receiving the aforesaid valid packet. A user of the PC 50 may send a packet including a print command to the printer 10, and then within a short interval send another packet including a print command to the printer 10. In the present embodiment, because the standby state 122 of the main CPU 14 is maintained for a predetermined time period after the processing state 124 has ended, another packet including a print command can be received while the main CPU 14 is in the standby state 122. In this case, since the main CPU 14 does not shift to the sleeping state 120, the main CPU 14 can shift immediately to the processing state 124 without executing the process to release the sleeping state 120 of the main CPU 14.

If, during the sleeping state 120, the main CPU 14 receives an invalid packet (that does not require the main CPU 14 to execute a process; and for which NO is judged in S40 of FIG. 6), the main CPU 14 changes the sleep shift flag to ON during execution of the invalid condition registration process of FIG. 7 (S62). In this case, the main CPU 14 judges YES in S12 of FIG. 5, and the main CPU 14 changes the state variable to the sleeping state (S16). Consequently, the sub CPU 24 judges YES in S90 of FIG. 9, and shifts the main CPU 14 to the sleeping state (S92). In the present embodiment, even if an invalid packet has been received during the sleeping state 120 of the main CPU 14 and the sleeping state 120 of the main CPU 14 is released, the main CPU 14 is shifted back to the sleeping state 120 before the predetermined time period has passed. A power-saving printer 10 can thus be realized.

The printer 10 is an example of a "communication device". The PC 50 is an example of an "external device". The network interface 30 is an example of a "receiving unit". The sleeping state 120 is an example of a "sleeping state". The standby state 122 and the processing state 124 are examples of a "non-sleeping state". The main CPU 14 is an example of a "main control unit". The sub CPU 24 is an example of a "sub control unit". The packet invalid condition storage area 66 of the first RAM 20 is an example of a "condition storage unit". The comparison object data 80 is an example of a "condition". The destination port number 140 included in the packet 130 is an example of "specific information". The sub CPU 24 executing the process S114 of FIG. 10 is an example of a "first judging unit". The sub CPU 24 executing the process S124 of FIG. 10 is an example of a "releasing unit". The main CPU 14 executing the processes S40 and S46 of FIG. 6 is an example of a "registration unit".

The main CPU 14 executing the process S40 of FIG. 6 is an example of a "second judging unit". The predetermined time period for shifting from the standby state 122 to the sleeping state 120, of FIG. 3, is an example of a "predetermined time period". The destination port number 140 included in the packet 130 is an example of "transport layer related information". The clock circuit 16 for main CPU is an example of a "clock supplying unit". The ROM 18 is an example of an "application-program storage unit". The valid port number storage area 90 of the second RAM 22 is an example of a "port information storage unit".

Variants of the above embodiment are listed below.

(1) In the above embodiment, the condition for maintaining the sleeping state of the main CPU 14 (i.e., the destination port number included in the invalid packet) is stored in the packet invalid condition storage area 66. However, the condition for releasing the sleeping state of the main CPU 14 (i.e., the destination port number included in the valid packet) may be stored in the packet invalid condition storage area 66. Further, the packet invalid condition storage area 66 may store both the condition for maintaining the sleeping state of the main CPU 14 and the condition for releasing the sleeping state of the main CPU 14.

(2) In the above embodiment, the main CPU 14 registers a condition in the packet invalid condition storage area 66. However, the sub CPU 24 may register a condition in the packet invalid condition storage area 66. Further, both the main CPU 14 and the sub CPU 24 may register conditions in the packet invalid condition storage area 66. E.g., the main CPU 14 (or sub CPU 24) may register the invalid packet 130 received during the sleeping state 120 of the main CPU 14, and the sub CPU 24 (or main CPU 14) may register the invalid packet 130 received during the non-sleeping states 122, 124 of the main CPU 14.

(3) In the above embodiment, the main CPU 14 executes the judgement process S40 of FIG. 6. However, the sub CPU 24 may execute the judgement process S40 of FIG. 6. Further, both the main CPU 14 and the sub CPU 24 may execute the judgement process S40 of FIG. 6. The main CPU 14 (or sub CPU 24) may execute the judgement process S40 of FIG. 6 for the packet 130 received during the sleeping state 120 of the main CPU 14, and the sub CPU 24 (or main CPU 14) may execute the judgement process S40 of FIG. 6 for the packet 130 received during the non-sleeping states 122, 124 of the main CPU 14.

(4) In the above embodiment, the sub CPU 24 suspends the clock supply to the main CPU 14 (see S92 of FIG. 9). However, the main CPU 14 may suspend the clock supply to itself. Further, both the main CPU 14 and sub CPU 24 may suspend the clock supply to the main CPU 14. The main CPU 14 and sub CPU 24 may execute the process S92 of FIG. 9 alternately.

(5) In the above embodiment, the main CPU 14 registers the condition in the packet invalid condition storage area 66 for the invalid packet 130 received during the sleeping state 120 (i.e. executes S46 executed if the answer is YES in S44), and does not register the condition for the invalid packet 130 received during the non-sleeping states 122, 124 (S46 is skipped if the answer is NO in S44). However, the condition may be registered in the latter situation as well. Further, the condition may not be registered in the former situation, and may be registered only in the latter situation.

(6) The sleeping state may be defined as e.g. a state having lower power consumption than the non-sleeping state.

What is claimed is:

1. A communication device configured to be connected with an external device in a communicable manner, the communication device comprising:
   a receiving unit configured to receive data sent from the external device;
   a main control unit configured to shift its state between a sleeping state and a non-sleeping state;
   a condition storage unit configured to store at least one of a condition for maintaining the sleeping state of the main control unit and a condition for releasing the sleeping state of the main control unit; and
   a sub control unit,
   a memory storing computer-executable instructions that, when executed by the sub control unit, cause the communication device to perform operations comprising:
      first judging, in a case where the data is received by the receiving unit while the main control unit is being in the sleeping state, whether the sleeping state of the main control unit is to be maintained based on specific information included in the data by referring to the condition stored in the condition storage unit; and
      releasing the sleeping state of the main control unit in a case where a negative judgment is made by the first judging,
   wherein the memory stores computer-executable instructions that, when executed by at least one of the main control unit and the sub control unit, causes the communication device to further perform operations comprising:
      registering, when object data is received by the receiving unit, a new condition in the condition storage unit based on the specific information included in the object data, and
      executing the registration of the new condition in a case where the sleeping state of the main control unit would be released by the releasing unit although the sleeping state of the main control unit should not be released under a presumption of the object data being received while the main control unit is in the sleeping state.

2. The communication device as in claim 1, wherein in a case where a plurality of conditions is stored in the condition storage unit, the first judging judges whether the sleeping state of the main control unit is to be maintained by sequentially referring to the plurality of conditions.

3. The communication device as in claim 2, wherein the first judging sequentially refers to the plurality of conditions in reversed chronological order of registration.

4. The communication device as in claim 1, wherein the registering comprises
   second judging, in a case where the object data was received by the receiving unit while the main control unit had been in the sleeping state, and the sleeping state of the main control unit has been released, whether the release of the sleeping state of the main control unit was necessary, and
   registering the new condition in the condition storage unit in a case where a negative judgment is made by the second judging.

5. The communication device as in claim 4, wherein
   in a case where the second judging judges that the release of the sleeping state of the main control unit was necessary, the main control unit is configured to shift to the sleeping state after a predetermined time period has passed since a time at which the main control unit shifted to the non-sleeping state, and
   in a case where the second judging judges that the release of the sleeping state of the main control unit was not necessary, the main control unit is configured to shift to the sleeping state before the predetermined time period has passed since the time at which the main control unit shifted to the non-sleeping state.

6. The communication device as in claim 1, wherein
   the specific information includes transport layer related information that relates to a transport layer,
   the condition includes transport layer related information that relates to the transport layer, and
   the first judging judges whether the sleeping state of the main control unit is to be maintained by comparing the condition stored in the condition storage unit and the specific information included in the data.

7. The communication device as in claim 6, wherein
the transport layer related information includes destination port information.

8. The communication device as in claim 6, wherein
the transport layer is a UDP layer.

9. The communication device as in claim 1, further comprising:
   a clock supplying unit configured to execute a clock supply to the main control unit,
   wherein the main control unit is in the non-sleeping state during an execution of the clock supply,
   the main control unit is in the sleeping state while the clock supply is suspended,
   wherein the memory stores computer-executable instructions that, when executed by at least one of the main control unit and the sub control unit, causes the communication device to further cause the clock supplying unit to suspend the clock supply, and in the case where the negative judgment is made by the first judging, the releasing releases the sleeping state of the main control unit by causing the clock supplying unit to execute the clock supply.

10. The communication device as in claim 1, further comprising:

an application-program storage unit configured to store a plurality of application-programs to be executed by the main control unit; and a port information storage unit configured to store, for each of the plurality of application-programs, application related information that is related to the application-program and port information that has been set in advance for the application-program, which are associated with each other, wherein the specific information includes destination port information, and in a case where destination port information included in the object data does not match with any of the port information stored in the port information storage unit, the registering includes registering the new condition in the condition storage unit based on the destination port information included in the object data.

11. The communication device as in claim 10, wherein the registering includes registering the new condition in the condition storage unit in a case where the object data is received by the receiving unit while the main control unit is being in the sleeping state, the sleeping state of the main control unit is received by the releasing, and the destination port information included in the object data does not match with any of the port information stored in the port information storage unit, and wherein the new condition is not registered in the condition storage unit in a case where the object data is received by the receiving nit while the main control unit is being in the non-sleeping state, and the destination port information included in the object data does not match with any of the port information stored in the port information storage unit.

* * * * *